United States Patent [19]
Fite, Jr. et al.

[11] Patent Number: 5,543,040
[45] Date of Patent: Aug. 6, 1996

[54] APPARATUS FOR PURIFICATION OF WATER-BASED FLUIDS IN CLOSED-LOOP FLOW SYSTEMS

[75] Inventors: Robert D. Fite, Jr.; John S. Ilasenko, both of Harbor Springs; Edwin H. Colburn, Middleville, all of Mich.

[73] Assignee: FI-Tek Purification Systems, Inc., Petoskey, Mich.

[21] Appl. No.: 354,249

[22] Filed: Dec. 12, 1994

[51] Int. Cl.$^6$ .................................................. C02F 1/50
[52] U.S. Cl. .................... 210/167; 204/228; 204/248; 204/293; 210/169; 210/192; 210/199; 210/205
[58] Field of Search .................... 204/149, 150, 204/228, 233, 248, 293; 210/748, 764, 94, 101, 192, 243, 198.1, 199, 205, 167, 169

[56] References Cited

U.S. PATENT DOCUMENTS

| | | | |
|---|---|---|---|
| 3,425,925 | 2/1969 | Fleischman | 204/248 |
| 4,525,253 | 6/1985 | Hayes et al. | 204/293 |
| 4,525,272 | 6/1985 | Henson | 210/149 |
| 4,680,114 | 7/1987 | Hayes | 210/192 |
| 4,719,018 | 1/1988 | Przybylski | 210/748 |
| 4,936,979 | 6/1990 | Brown | 204/293 |
| 5,114,571 | 5/1992 | Pier et al. | 210/243 |
| 5,364,512 | 11/1994 | Earl | 210/192 |

FOREIGN PATENT DOCUMENTS

| | | |
|---|---|---|
| 0128782 | 12/1984 | United Kingdom . |
| 8707251 | 12/1987 | United Kingdom . |
| 9420420 | 9/1994 | United Kingdom . |

OTHER PUBLICATIONS

Apr. 1995 Modern Paint and Coatings, p. 6. News Release: Trends. Technology–Ionization System Developed for Bacteria Control.

Primary Examiner—Peter A. Hruskoci
Attorney, Agent, or Firm—J. Gibson Semmes

[57] ABSTRACT

The present industrial purification system consists of an electronic power supply and control unit, an ionization delivery unit, having at least one unique Copper/Silver electrode rods. It's objective as applied to water-based fluids in a closed-loop flow system is to prevent electrostatic materials from building up on the cathodic ionization rods and/or achieving ionization in very low conductive water-based systems which have as their medium de-ionized, ultra-purified, or reverse osmosis filtered water. The power supply and control unit requires 120 or 240 vac input at less than 1 amp, and provides an adjustable regulated dc voltage to the electrode rods, dc voltage being 50 volts. A zero center meter on the control panel indicates the actual voltage supplied to the electrodes, whereas current flowing through the electrodes is indicated by a second zero centered meter. At intervals of approximately 4 minutes, the polarity of the current flowing through electrodes 124–124' is automatically shut off to cause these electrodes to clean and reverse the effects of electrolysis action at said electrodes. This action being fully solid state will be evident by the direction of deflection on a control panel meter. The ionization system functions by taking 110 v AC, changing it to 50 v dc and ionizing the anodic 71/29% Copper/Silver ionization rod. Adjacent stainless steel cathodic "Defender" ionization posts prevent paint and other conducting material from adhering to the ionization rod per se.

8 Claims, 7 Drawing Sheets

APPARATUS FOR PURIFICATION OF WATER-BASED FLUIDS IN CLOSED-LOOP FLOW SYSTEMS

BACKGROUND OF THE INVENTION

The invention relates to closed-loop water and water-based systems such as paint tanks, cooling towers and swimming pools wherein, by ionizing trace amounts of copper and silver into the flow of water-based fluids, one kills bacteria, algae and spores within a given circulation system. In an existing conduit, bypass flow cells are disposed in-line of the circulation system. These flow cells activate ionization by means of at least one Copper/Silver electrode within each purification cell and at least two stainless steel electrodes, all having immersion contact with the constant flowing water-based fluids passing therethrough.

In the past, two or more Copper/Silver electrodes were used, one being the cathode and one being the anode to achieve ionization of one electrode. Polarity was then reversed so that the other electrode would then start ionizing into solution, thus assuring an even wear of both electrodes. In an electrostatic fluid such as E-Coat, the paint would be attracted to the cathode (in the case of cathodic paints which are positively charged), covering and insulating the electrode and precluding the ionization process.

SUMMARY OF THE INVENTION

The industrial purification system consists of an electronic power supply and control unit, an ionization delivery unit, having unique Copper/Silver electrode rods. The power supply and control unit requires 120 or 240 vac input at less than 1 amp, and provides an adjustable regulated dc voltage to the electrode rods, dc voltage being 50 volts. A zero center meter on the control panel indicates the actual voltage supplied to the electrodes, whereas current flowing through the electrodes is indicated by a second zero centered meter. At intervals of approximately 4 minutes, the current flowing through the electrodes is shut off to cause all electrodes to clean and reverse the effect of the electrolysis action at the defender electrodes. This action being fully solid state will be evident by the direction of deflection on a control panel meter.

Lamp indicators mounted on the control panel indicate normal functioning or the existence of a short condition between the electrodes. Also on the control panel is a power "on" switch, power and load circuit breakers, and an adjustment knob to adjust the level of voltage applied to the electrodes.

The ionization system works by taking 110 v AC, changing it to 50 v DC and ionizing the 71%–29% Copper/Silver ionization electrode. Stainless steel "Defender" ionization posts prevent paint and other conducting material from adhering to the ionization electrode per se. The ionization electrode and ionization rods may comprise various other configurations having the purpose of preventing electrostatic materials from building up on the ionization electrodes or achieving ionization in very low conductive water-based systems which have as their medium de-ionized, ultra-purified, or reverse osmosis filtered water.

DESCRIPTION OF PREFERRED EMBODIMENTS

APPARATUS

Figure 1:
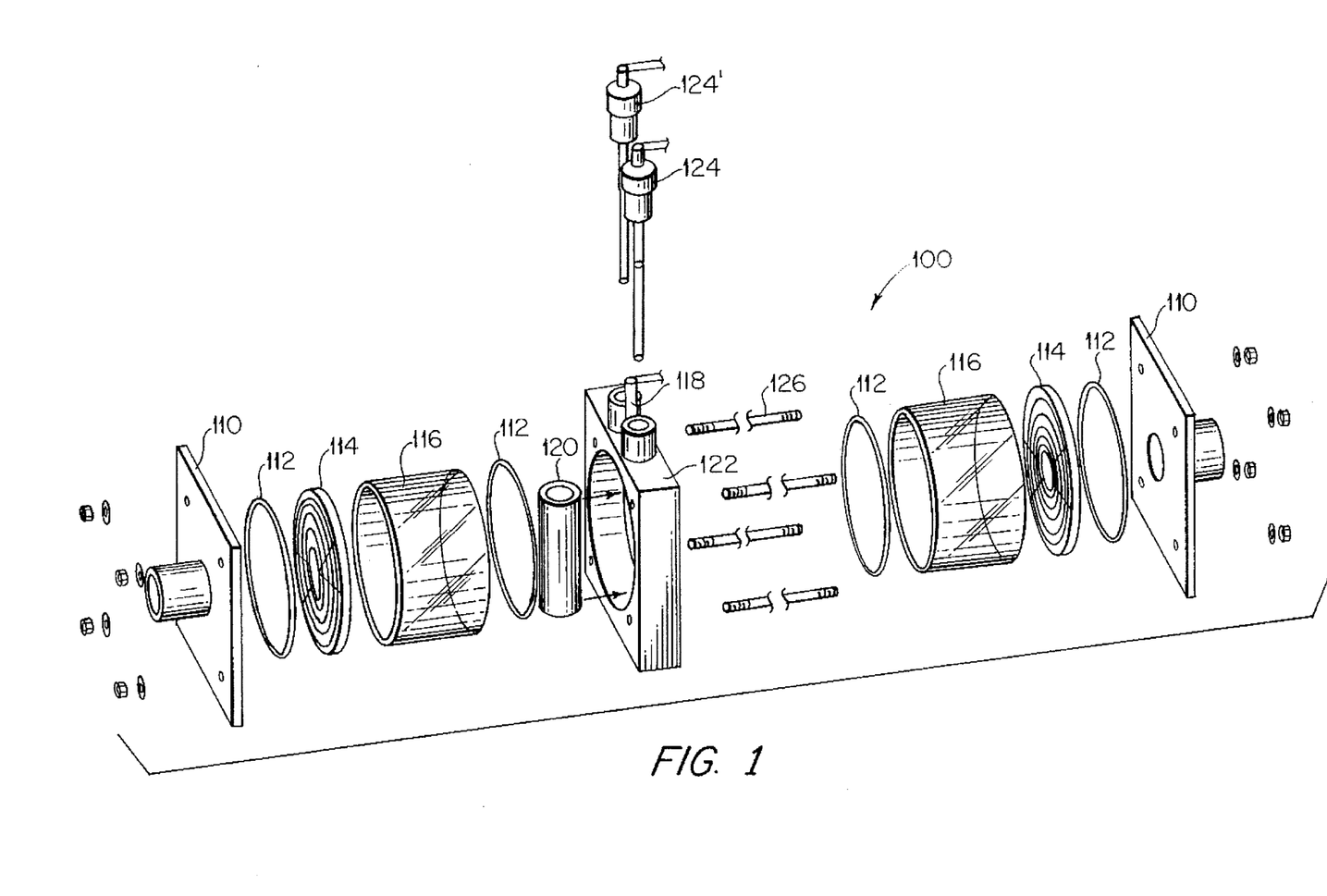
FIG. 1 is an exploded view in perspective of one form of the closed loop purification cell apparatus.

Referring to FIG. 1, the flow cell 100 having adaptation to a closed-loop water and/or water-based system, has its input end on the lefthand, stainless steel adaptor plate 110, with a comparable adaptor plate on the output end of the cell. Likewise, appropriate Viton D-rings 112 are interposed between elements hereinafter indicated, one each being adjacent the input end and the output end of the cell, separating elements from the adaptor plates and other elements, as indicated. Turbulence creating safety screens 114 are likewise interposed at input and output ends, between the adaptor plates 110 and aligned housings 116, said arrangement appearing on both sides of the insulated housing brackets. Transparent, see-through housings 116 are interposed between the screens 114 and the anodic Copper/Silver ionization rod 120. The cylindrical ionization rod 120 is housed within dielectric insulating housing bracket 122 by means of nonconductive post 118. Post 118 secures the anodic ionization 71/29% rod 120 centrally, in a vertical position, relative to the horizontal flow of the fluids under treatment. Defender stainless steel cathodic ionization rods 124 are likewise disposed transversely in-line in the housing/bracket 122, immediately adjacent the vertical wall of the ionization rod 120. The cathodic electrodes 124–124' are retained in the bracket by quick-release retainers to enhance cleaning. They are interconnected to terminal 2 of the FIG. 6 circuit. A mirror image assembly appears on the downstream side of the housing 122, all being secured by assembly rods 126, completing the construction to the output end of the cell 100.

Figure 2:
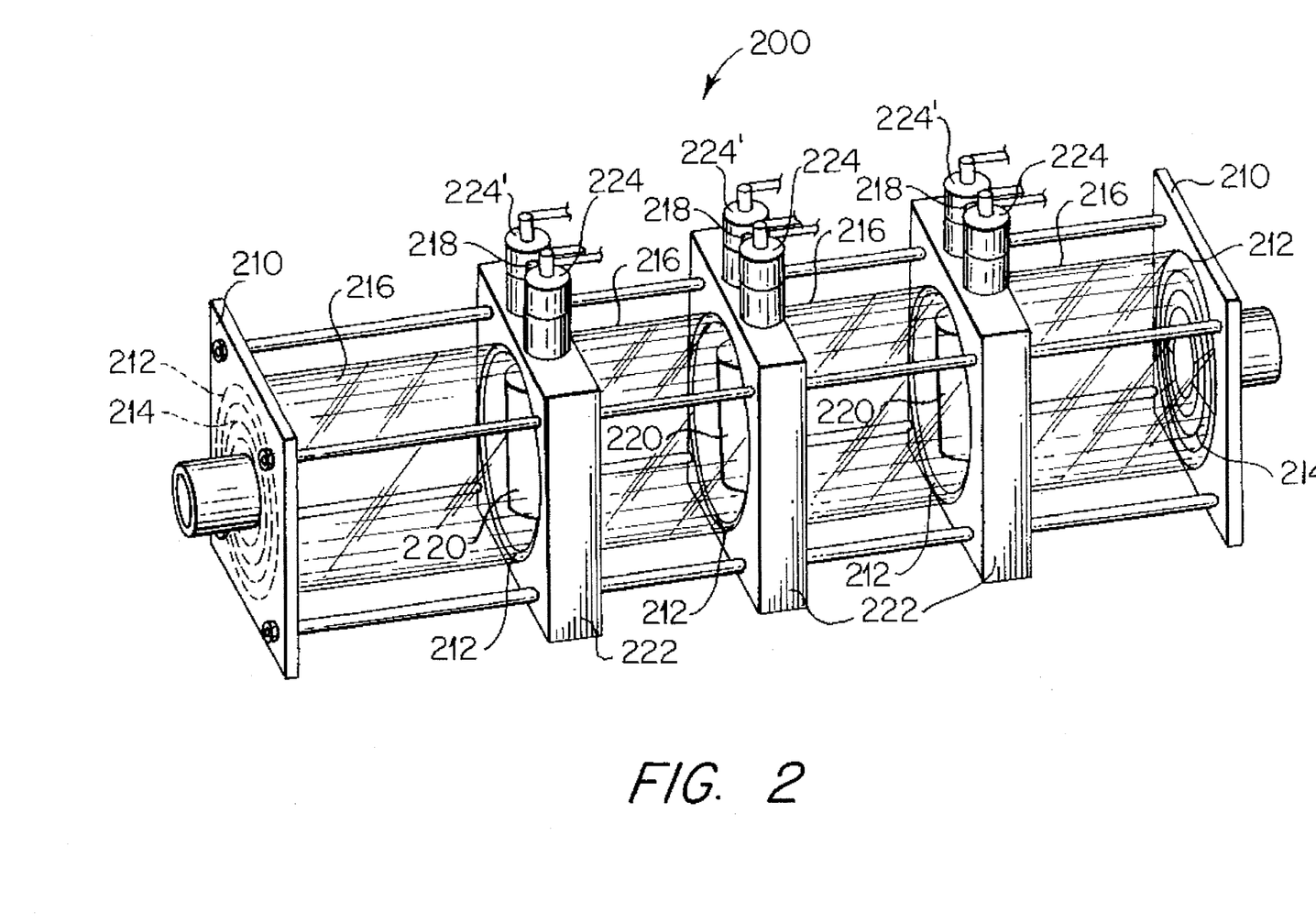
FIG. 2 is an exploded view in perspective of multiple purification cells for use on closed-loop water and water-based systems.

The invention has an inherent characteristic of being able to "stack" units together in any quantity needed to provide the desired amount of Copper and Silver ions required to achieve a good bacterial "kill" in the closed-loop. This is accomplished by the use of the Insulated Housing Bracket 122–222. This bracket holds rods and assemblies needed to perform the ionization process, and is a complete and discrete ionization unit. Thus, modular units which can be stacked or piggy-backed into a compound system of as many units as needed to achieve the desired objective. Referring thus to FIG. 2, the flow cell 200 of this modular combination, having adaptation to a closed-loop water and/or water-based system, its input end on the lefthand, secures stainless steel adaptor plate 210, with a comparable adaptor plate at the output end of the cell. Likewise, appropriate Viton D-rings 212 are interposed between screen, see-through housings and bracket as indicated, separating elements from the adaptor plates and other elements, exactly as indicated in the parent flow cell 100, above. "Turbulence safety screens 214 are thus likewise interposed at input and output ends, between the adaptor plates 210 and an ionization station, said arrangement appearing on both sides of the ionization station, substantially as shown on input and output ends of the exploded view, FIG. 1 wherein elements 110, 112 and 114 comprise counterparts to elements 210, 212 and 214 of FIG. 2. See-through housings 216 are interposed between the screens 214 and the copper/silver ionization rod 220, said cylindrical ionization rod being housed within dielectric insulating housing bracket 222 by means of conductive post 220' which secures the ionization rod centrally, in a vertical position relative to the horizontal flow of the fluids under treatment. Defender stainless steel ionization posts 224 are likewise disposed in the bracket 222, immediately adjacent the vertical wall of each ionization rod 220. As in the FIG. 1 configuration, these ionization rods are interconnected to terminal 2 of the FIG. 6 circuit. A similar assembly appears on the downstream side of the housing 222, completing the construction to and through the output end of the cell 200.

In the present system represented in FIGS. 1 and 2, the anode comprises a Copper/Silver rod 120 and the two stainless steel rods together comprise the cathode. The paint is attracted to these cathodic rods and it has difficulty sticking to them, thus leaving the Copper/Silver rod surface, clean. Instead of reversing the polarity at that instant, the system is timed to shut the current "off" for several minutes to allow the natural flow and turbulence in the cell to wash off any paint particles (dirt) that may have started to adhere to the so-called Defender rods. Due to the proximity and the difference in electronic potentials between respective rods, one also has the added benefit of achieving ionization in very low conductive water such as DI (de-ionized) water which is used in all E-Coat baths and rinse tanks. This invention is based upon the theory that ionization cannot occur in water with very low conductivity there being nothing in the water to carry the electric charge between cathode and the anode.

ENABLING POWER AND CONTROL CIRCUIT

Figure 3:
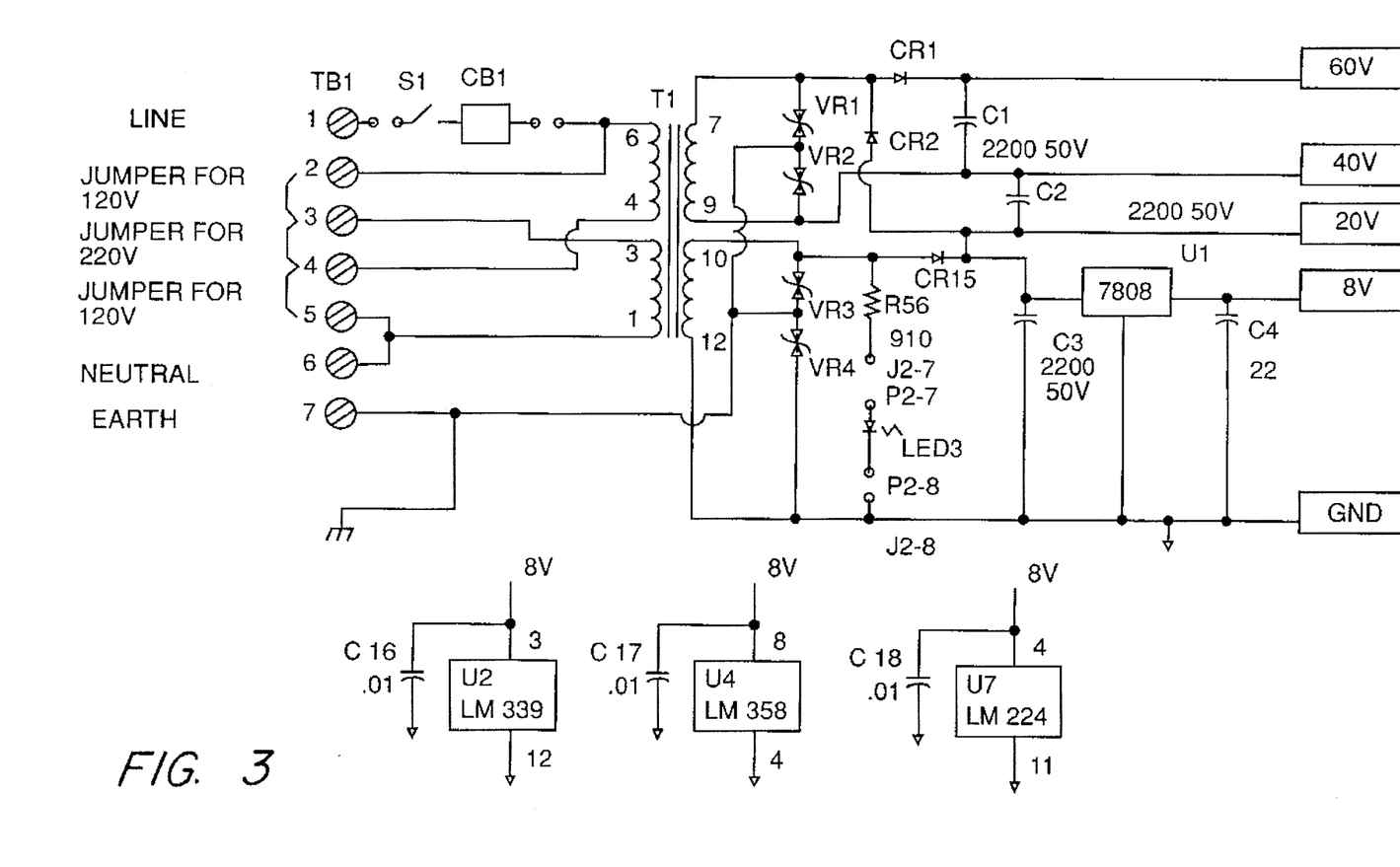
FIG. 3 illustrates by schematic the Power Supply of the electronic circuit, herein.

Referring to FIG. 3, present purification enabling circuit consists of an electronic power supply and control unit, an ionization delivery unit, and at least one copper/silver electrode. The power supply and control unit requires 120 or 240 vac input at less than 1 amp. It provides an adjustable regulated dc voltage to the electrodes, the maximum dc voltage being 50 volts. A zero center meter on the control panel indicates the actual voltage supplied to the electrodes. Current flowing through the electrodes is indicated by a second zero centered meter. At intervals of approximately 4 minutes the polarity of the current flowing through the electrodes is reversed to cause the electrodes to clean by reversing the electrolysis action at the electrode. This action is fully solid state and will be evident by the direction of deflection on the control panel meter.

Lamp indicators mounted on the control panel indicate normal functioning operation and whether or not a short condition exists as between electrodes. Also on the control panel is a power "on" switch, power and load circuit breakers, and an adjustment knob to adjust the level of voltage applied to the electrodes. This solid state control unit meters the stream of ions released in the flow of liquid with very low voltage being applied to the electrodes to ensure complete safety.

The control panel is mounted and visible through a windowed NEMA 12 metal enclosure approximately 12 inches high by 12 inches wide by 6 inches deep. The hinged cover is secured by quick release latches to maintain the NEMA 12 sealing requirements and a key lock to maintain tamper-proof adjustments. Window dimensions are approximately 9 inches by 5.5 inches.

| Electronic Function Summary | |
|---|---|
| Power Input: | 120/240 vac 50/60 Hz lamp max at 120 vac switched; circuit breaker protected |
| Output to Electrodes: | 50 vdc max adjustable breaker protected |
| Indicators: | normal operation & electrodes shorted |
| Voltage Metering: | −50 volts _0_ +50 volts 3.5" meter |
| Current Metering | −1 amp _0_ +1 amp 3.5" meter |
| Enclosure | NEMA 12 metal; 12" × 12" × 6" key lock window: 9" × 5.5"; quick release latches |

Figure 4:
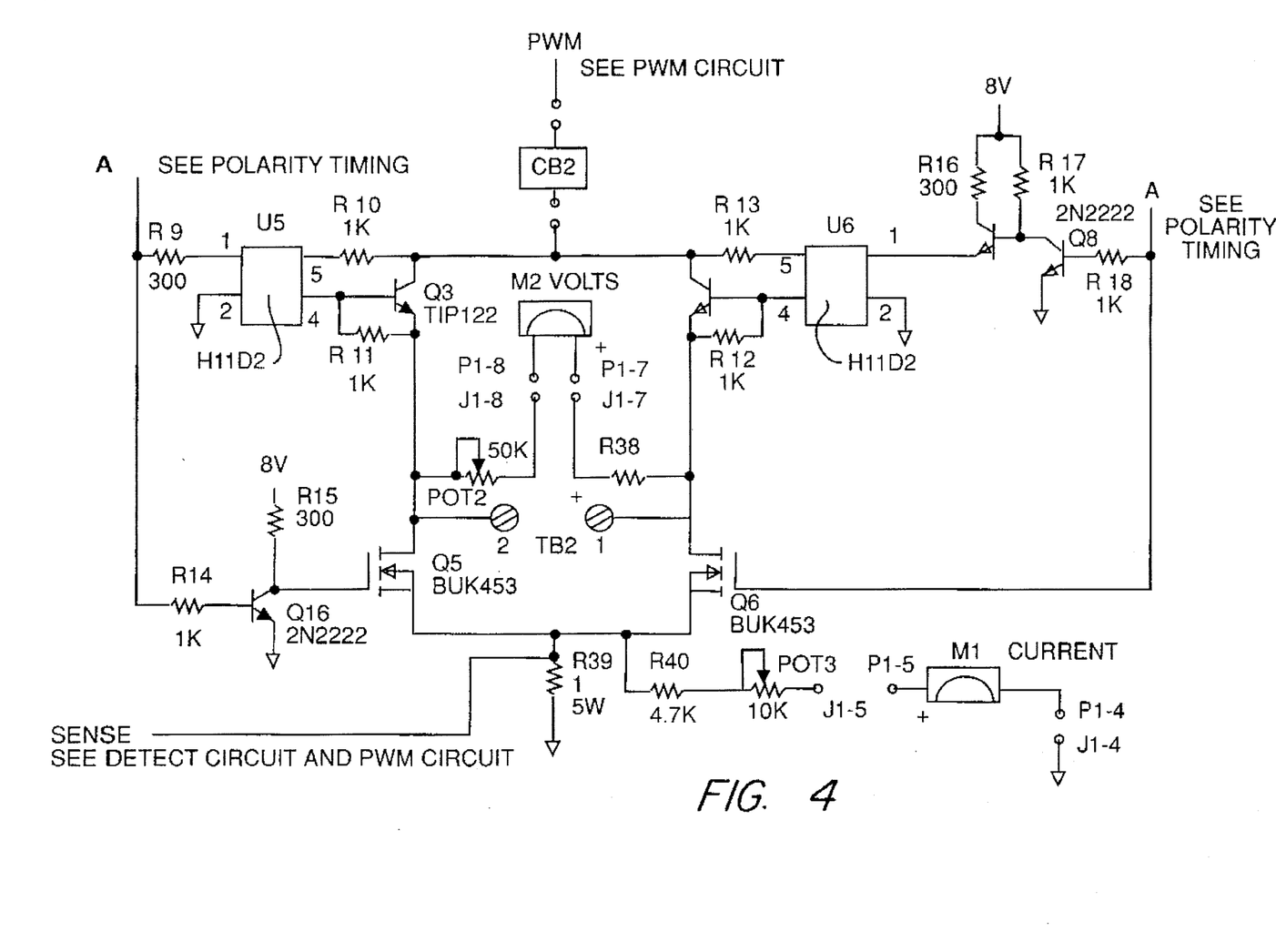
FIG. 4 illustrates the Polarity Switch as applied to the electrodes, herein. See PWM Circuit FIG. 6 and Detect Circuit FIG. 7, below.

Referring to FIG. 4, the power supply part of the circuit is responsible for providing the basic direct current voltages used in the rest of the circuitry. The output of the transformer is half wave rectified through CR 15 and C3 to provide 20 volts direct current. This is then regulated by U1 to provide 8 volts d.c. which supplies power to U2, U3, U4, and U7, as well as reference voltages in the rest of the circuitry. CR1, CR2, C1, and C2 provide two more half wave rectified 20 volt supplies. When added to the 20 volts from CR15 useful voltage outputs of 20 volts, 40 volts, and 60 volts are thus derived.

LED 3 will be on whenever S1 is closed indicating power is applied to the system. Circuit breaker CB1 provides protection for the 120 v/220 v lines against a major short in the system.

Figure 5:
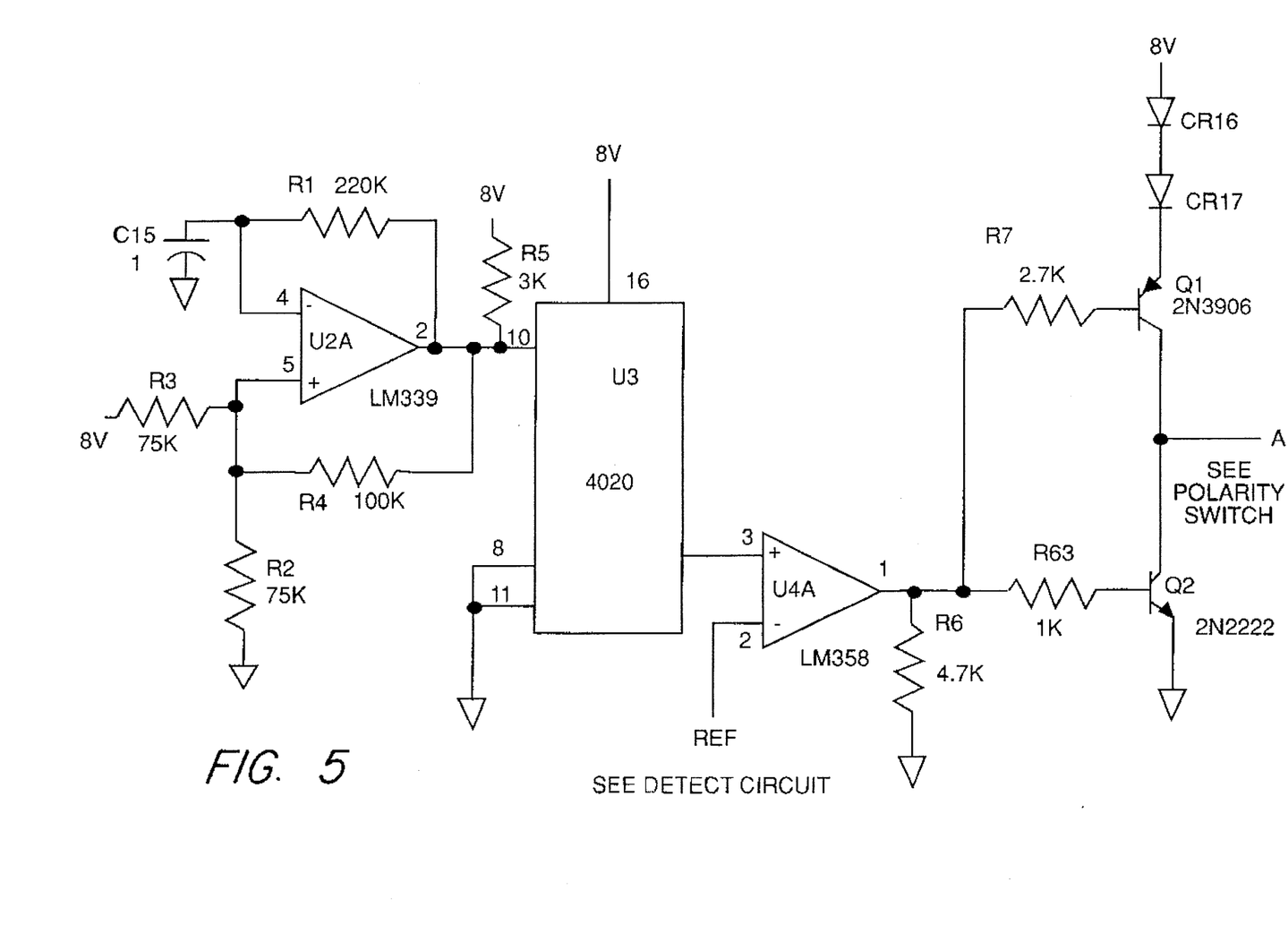
FIG. 5 illustrates Polarity Timing herein, reference Detect Circuit, FIG. 7, hereinafter.
Figure 7:
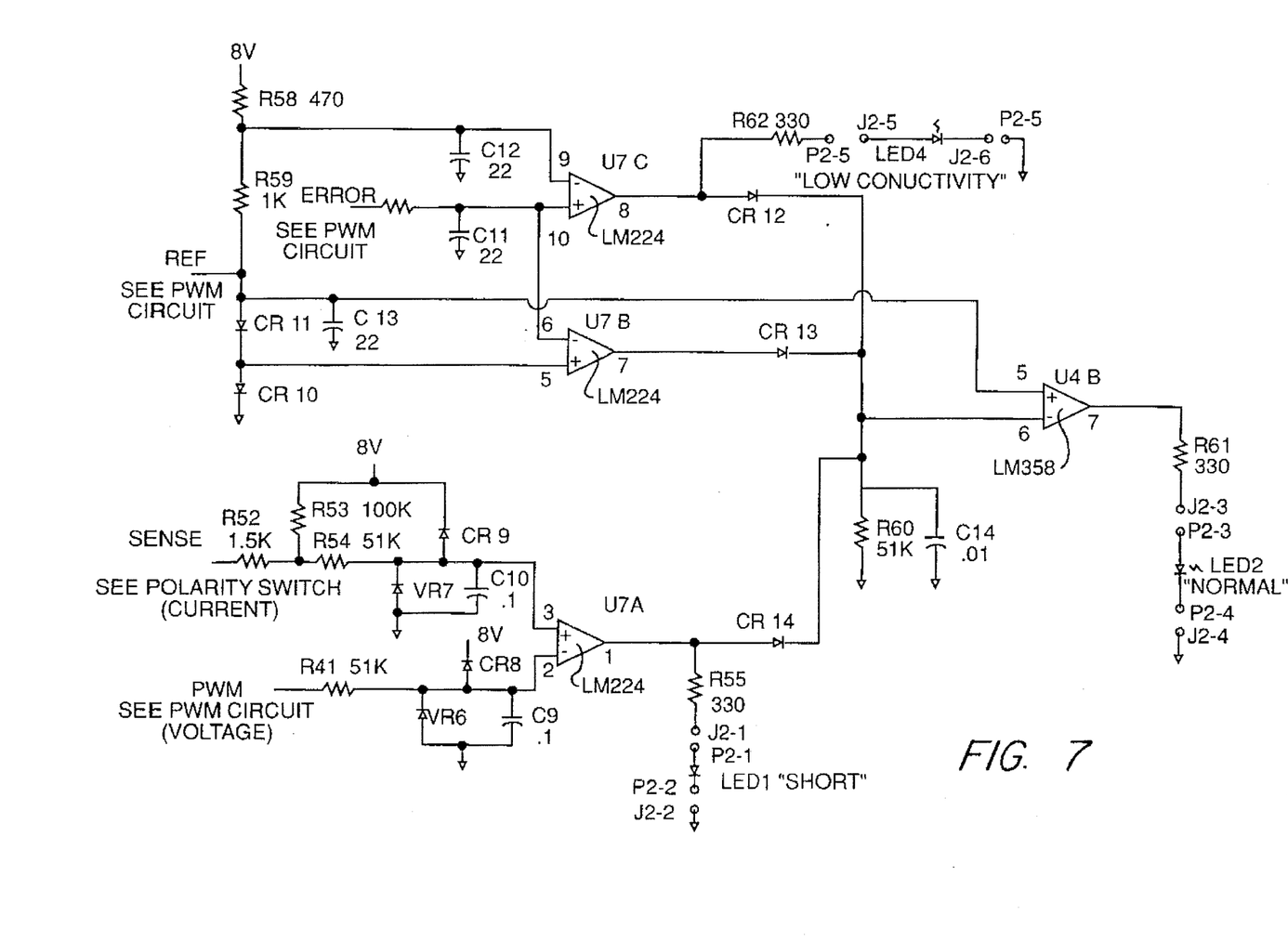
FIG. 7 illustrates the Detect Circuit of the control.

Referring to FIG. 5, the direct current electrode voltage is supplied from PWM Circuit, FIG. 7 to transistor switches Q4 and Q3 through 1 amp circuit breaker CB2.

Figure 6:
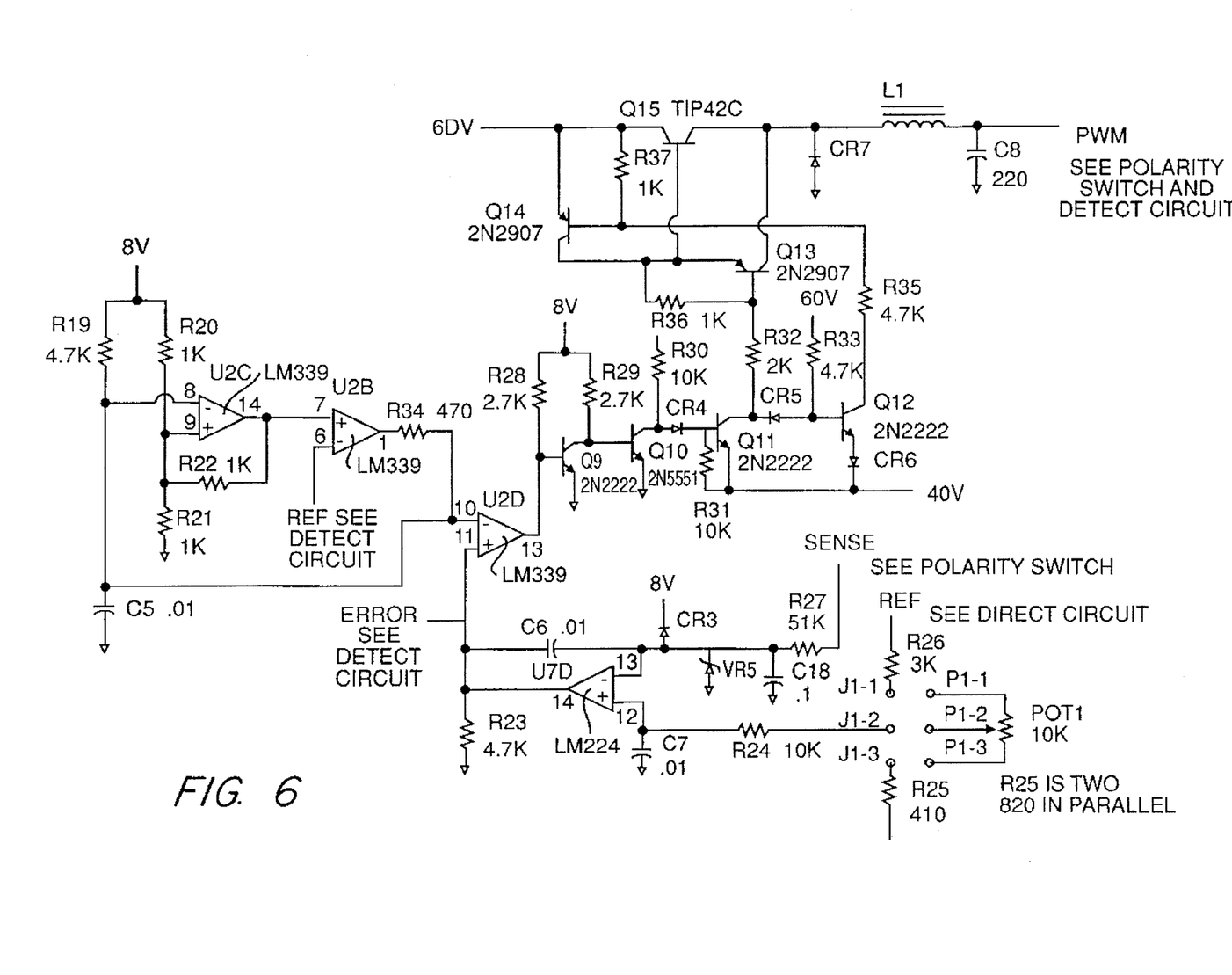
FIG. 6 illustrates the PWM Circuit herein, reference FIG. 4 the Polarity Switch.

Signal A from the Polarity Timing Circuit, reference FIG. 6 herein, in association with opto isolators U5 and U6 and transistors Q7 and Q8 causes transistors Q3 and Q4 to alternate between conduction and cut-off, i.e. when Q4 is conducting Q3 is cut off, etc., thus supplying current to the electrodes (TB2) in an alternating polarity fashion. Meter M2 with scaling resistors POT2 and R38 reads the actual voltage across the electrodes. At the same time that Q3 is conducting Q6 also conducts, completing the current path through the electrodes, water, Q3, Q6, and R39. When signal A changes state, i.e. goes low, then Q3 and Q6 stop conducting and Q4 and Q5 start conducting, providing current through the electrodes in the opposite direction. Note that current travels through R39 in the same direction in both cases, thus providing a direct current voltage level at SENSE representative of the electrode current. Scaling resistors R40 and POT3 allow meter M2 to be calibrated to indicate electrode current. By modification, transistors Q3 and Q6 may be removed, providing an electrode current in only one direction with no current flowing when Q3 and Q6 are not conducting.

Referring to FIG. 6, U2A in conjunction with C15, R1, R2, R4, and R5 produce an oscillator. The oscillator drives divider U3 which is wired to provide an output that alternates between high and low at approximately four minutes in each state. U4A then drives transistors Q1 and Q2 providing appropriate switching to drive the transistors, FIG. 5 herein, which in turn switch electrode current polarity. With minor modification, this circuit may provide electrode timing other than four minutes in each sate. An example of this timing might be 2 minutes in one state and 6 minutes in the other.

Referring to FIG. 7, U2B, U2C, R19, R20, R21, R22, R34, and C5 produce a sawtooth oscillator at about 50 Khz. U7D produces and ERROR signal by comparing the SENSE voltage from the schematic FIG. 5 herein (representative of electrode current) with the setpoint voltage from POT1. U2D compares the ERROR signal with the sawtooth oscillator output thus producing a pulse width modulated signal with "On" time representative of how long the electrode must be turned on to provide the current required to meet the setpoint selected on POT1. Transistors Q9 through Q15, and associated resistors, provide switching of the 60 volt supply in response to the above pulse width modulated signal. When filtered by L1 and C8 the switched signal becomes the proper electrode voltage to supply the current desired by the setpoint of POT1. This voltage is signal labeled PWM. This action is typical of a switch mode down converter power supply. In operation, the ERROR signal from the PWM circuit FIG. 6 is filtered by R57 and C11 and compared to reference levels of 0.6 volts and approximately 5.8 volts in U7C and U7B. If ERROR is larger than 5.8 volts indicating the setpoint is larger than the electrode current than LED4 "low conductivity" is turned on and about 8 volts is seen at the output of U7C; otherwise a low level is seen at this output. If ERROR is between 0.6 volts and 5.8 volts, then the electrodes in water are providing enough conductivity for the system to operate normally thus producing a low voltage at the output of U7B. Resistors R53 and R52 provide an input to U7A inversely proportional to the electrode current. U7A compares this signal to the electrode voltage. If the voltage is greater than the signal which is inversely proportional to electrode current then a shorted electrode condition is indicated by LED1 "short" being on. If all three outputs from U7A, B and C are all low levels then U4B will produce an output to turn on LED2 indicating normal operations.

The invention is limited solely by the scope of appended claims. Whereas the term electrode rod has been recited herein, defining the several types of cell electrodes, the electrodes, per se, may comprise various other forms such as tubes, cages, cylinders and the like without departing from the spirit of invention as claimed.

We claim:

1. In a closed-loop water and water-based fluid purification system, a bypass unit for ionization of trace amounts of copper and silver into a fluid flow, comprising:

a) substantially rigid, hermetically sealed flow cell (100) having input and output ends (110), with turbulent screens (114) adjacent respective ends, said screens having interconnection with aligned see-through housings (116) which space the screens from an ionization station;

b) at least one housing bracket (122) for the ionization station and an anodic copper/silver ionization electrode (120) within the housing bracket of the station, said anodic electrode having a proportion of copper which is in excess of a proportion of silver;

c) stainless steel cathodic ionization electrodes (124–124') disposed immediately adjacent said anodic ionization electrode (120) and within the housing bracket of the ionization station;

d) solid state power and control enabling circuits connected to respective cathodic electrodes (124–124') wherein current flowing through the electrodes (124–124') is shut off at timed intervals, to cause these electrodes to clean and reverse the effect of electrolysis action at all electrodes.

2. The bypass unit according to claim 1 wherein the copper/silver ionization electrode (120) comprises a composite of 79% copper and 21% silver.

3. Thee bypass unit of claim 2 wherein the respective electrodes (120) and (124–124') define probes which are disposed at right angles to the fluid flow, said electrodes being positioned transversely of the flow, in-line of each other.

4. The bypass unit of claim 3 wherein the enabling and power circuits comprise 120–240 vac input at less than 1 amp, to provide to respective electrodes an adjustable regulated dc voltage which is no greater than 50 volts.

5. In a closed-loop water and water-based fluid purification system, a bypass unit for ionization of trace amounts of copper and silver into a fluid flow, comprising:

a) substantially rigid, hermetically sealed flow cell (200) having input and output ends (210), with turbulent screens (214) adjacent the respective ends, said screens having interconnection with aligned (216) see-through housings which space the screens from plural in-line ionization stations;

b) successive housing brackets (222) in-line with see-through housings (216) for the ionization stations and an anodic copper/silver ionization electrode (220) within each station housing (216), each said anodic electrode having a proportion of copper which is in excess of a proportion of silver;

c) stainless steel cathodic ionization electrodes (224–224') disposed immediately adjacent each said anodic ionization electrode (220) and within the housing bracket of the respective ionization stations;

d) solid state power and control enabling circuits connected to respective cathodic electrodes (224–224') wherein current flowing through said electrodes is shut off at timed intervals to cause said electrodes to clean and reverse the effect of the electrolysis action at all electrodes.

6. The bypass unit according to claim 5 wherein the respective electrodes (220) and (224–224') define probes which are disposed at right angles to the fluid flow, said probes being positioned transversely of the fluid flow, in-line of each other.

7. The bypass unit of claim 6 wherein respective anodic ionization electrodes each comprise a composite of 79% copper and 21% silver.

8. The bypass unit of claim 7 wherein the enabling power circuits comprise 120/240 vac input at less than 1 amp, to provide to the respective electrodes an adjustable regulated dc voltage which is no greater than 50 volts.

* * * * *